United States Patent [19]

Shu

[11] Patent Number: 5,358,565
[45] Date of Patent: Oct. 25, 1994

[54] STEAM INJECTION PROFILE CONTROL AGENT AND PROCESS

[75] Inventor: Paul Shu, Cranbury, N.J.

[73] Assignee: Mobil Oil Corporation, Fairfax, Va.

[21] Appl. No.: 86,297

[22] Filed: Jul. 6, 1993

Related U.S. Application Data

[60] Division of Ser. No. 810,662, Dec. 19, 1991, Pat. No. 5,257,664, which is a continuation-in-part of Ser. No. 622,588, Dec. 3, 1990, Pat. No. 5,103,907.

[51] Int. Cl.$^5$ .................. C04B 12/04; E21B 33/13
[52] U.S. Cl. .................. 106/634; 106/600; 106/603; 106/638; 106/802; 166/261; 166/292; 166/294; 252/8.551; 405/266; 405/267; 405/269
[58] Field of Search ............... 106/600, 634, 603, 635, 106/802; 166/261, 270, 272, 292, 293, 294, 295; 252/8.551; 405/266, 267, 269

[56] References Cited

U.S. PATENT DOCUMENTS

| | | | |
|---|---|---|---|
| 2,402,588 | 6/1946 | Andresen | 166/21 |
| 2,747,670 | 5/1956 | King et al. | 166/21 |
| 3,261,400 | 7/1966 | Elfrink | 166/30 |
| 3,342,262 | 9/1967 | King et al. | 166/29 |
| 3,530,937 | 9/1970 | Bernard | 166/270 |
| 3,645,446 | 2/1972 | Patten | 239/14 |
| 3,805,893 | 4/1974 | Sarem | 166/270 |
| 3,871,452 | 3/1975 | Sarem | 166/270 |
| 3,918,521 | 11/1975 | Snavely, Jr. et al. | 166/272 |
| 3,965,986 | 6/1976 | Christopher | 166/292 |
| 4,440,227 | 4/1984 | Holmes | 166/261 |
| 4,479,894 | 10/1984 | Chen et al. | 252/8.55 |
| 4,489,783 | 12/1984 | Shu | 166/272 |
| 4,513,821 | 4/1985 | Shu | 166/273 |
| 4,660,640 | 4/1987 | Hoskin et al. | 166/270 |
| 4,669,542 | 6/1987 | Venkatesan | 166/258 |
| 4,804,043 | 2/1989 | Shu et al. | 166/263 |
| 5,103,907 | 4/1992 | Shu | 166/272 |
| 5,190,104 | 3/1993 | Shu | 166/294 |

*Primary Examiner*—Anthony Green
*Assistant Examiner*—Michael Miarcheschi
*Attorney, Agent, or Firm*—Alexander J. McKillop; George W. Hager, Jr.; Charles A. Malone

[57] ABSTRACT

A method and composition for controlling the profile of a formation where temperatures higher than 400° F. are encountered. An aqueous solution of an organoammonium silicate, alkali metal or ammonium silicate is injected into a zone of higher permeability in a formation. Subsequently, a spacer volume of a water-immiscible organic solvent is directed into said zone. Afterwards, a water-miscible organic solvent containing an alkylpolysilicate and an inorganic salt or a chelated calcium compound are injected into the higher permeability zone. A silicate cement is formed in-situ thereby substantially closing the higher permeability zone to fluid flow. Thereafter, a steam-flooding, water-flooding, carbon dioxide-flooding, or fire-flooding EOR operation is commenced in a lower permeability zone.

7 Claims, 1 Drawing Sheet

STEAM INJECTION PROFILE CONTROL AGENT AND PROCESS

This is a division of application Ser. No. 07/810,662, filed Dec. 19, 1991 U.S. Pat. No. 5,257,664 which is a continuation-in-part of application Ser. No. 07/622,588, filed Dec. 3, 1990 U.S. Pat. No. 5,103,907.

FIELD OF THE INVENTION

This invention relates to the plugging of a more permeable zone of a subterranean formation. More particularly, the invention relates to a novel method of forming a calcium silicate in-situ which covers a substantial areal extent of a more permeable zone. The method of this invention is especially useful in promoting more uniform fluid injection patterns so as to tolerate high pH steam while conducting a steam-flooding or fire-flooding enhanced oil recovery operation in a lesser permeability zone.

Background of the Invention

Steam or fire stimulation recovery techniques are used to increase production from an oil-bearing formation. In steam stimulation techniques, steam is used to heat a section of a formation adjacent to a wellbore so that production rates are increased through lowered oil viscosities.

In a typical conventional steam stimulation injection cycle, steam is injected into a desired section of a reservoir or formation. A shut-in (or soak phase) may follow, in which thermal energy diffuses through the formation. A production phase follows in which oil is produced until oil production rates decrease to an uneconomical amount. Subsequent injection cycles are often used to increase recovery.

Steam stimulation techniques recover oil at rates as high as 80–85% of the original oil in place in zones at which steam contacts the reservoir. However, there are problems in contacting all zones of a formation due to heterogeneities in the reservoir, such as high/low permeability streaks, which may cause steam fingering. When any of these heterogeneities are present in a reservoir, the efficiency of a process begins to deteriorate due to reduced reservoir pressure, reservoir reheating, longer production cycles and reduced oil-steam ratios. As a result, steam stimulation may become unprofitable.

Various methods have been proposed so that steam can be diverted to uncontacted zones of a formation. One such method is disclosed in U.S. Pat. No. 2,402,588 which issued to Andersen. Andersen disclosed a method of filling a more permeable zone of a reservoir by injecting a dilute alkaline solution of sodium silicate under low pressure. An acid gas such as carbon dioxide is then injected to reduce the alkalinity of the solution, which results in the forming of a silica gel.

Another method is disclosed in U.S. Pat. No. 3,645,446 which issued to Young et al. Young discloses the plugging of a zone of a reservoir by injecting a mixture of steam and sodium silicate into the permeable zone. A second mixture containing steam and a gelling agent such as carbon dioxide is injected into the permeable zone and the two mixtures are allowed to react. A hard silica gel plug is formed.

Another method is disclosed in U.S. Pat. No. 3,805,893 which issued to Sarem. Sarem discloses the formation of a gelatinous precipitate by injecting small slugs of a dilute aqueous alkali metal silicate solution, followed by water and then a dilute aqueous solution of a water-soluble material which reacts with the alkali metal silicate to form a precipitate. The precipitate hardens to form a substantially impermeable substance. A water-flooding oil recovery method is then conducted in a lower permeability zone.

Christopher discloses another method in U.S. Pat. No. 3,965,986. In this method, a slug of liquid colloidal silica and water is injected into a reservoir. This slug has a relatively low viscosity. A surfactant is next injected therein which forms a gel on contact with the silica slug.

In each of the above methods, a relatively impermeable gel can be formed. However, none of the above methods provide for a way of retaining a desired permeability of a formation where high pH's ($>10$) are encountered since they form a plug which is silica in nature.

Therefore, what is needed is a method for controlling the permeability of a formation to the extent desired so as to enable the conducting of a steam-flooding or fire-flooding operation in a zone of lesser permeability.

SUMMARY

This invention is directed to a method for permeability profile control where a carbon dioxide stimulation, water-flooding, steam-flooding or fire-flooding enhanced oil recovery is initiated. In the practice of this invention, an aqueous organoammonium silicate, alkali metal or ammonium silicate solution is injected into a higher permeability zone of the formation where fluid flow modification is desired. The aqueous silicate solution enters the higher permeability zone through perforations made in a well penetrating the formation. By use of a mechanical packer, penetration of the aqueous silicate solution into the higher permeability zone can be controlled. As the aqueous silicate enters the zone, it saturates said higher permeability zone.

Thereafter, a spacer volume of a water-miscible organic solvent is directed into the higher permeability zone. Solvents for use herein are selected from a member of the group consisting of methanol, ethanol, higher alcohols, ketones, tetrahydrofuran, and dimethyl sulfoxide.

After a desired spacer volume of water-miscible solvent has been placed into the higher permeability zone, a water-miscible organic solvent containing an inorganic salt, preferably hydrated calcium chloride or a chelated calcium compound is next injected into the higher permeability zone. Upon coming into contact with the organoammonium silicate, alkali metal or ammonium silicate solution which remains on the sand grains and between the sand grain contact points, said salt or chelated calcium compound reacts with the organoammonium silicate, alkali metal or ammonium silicate to form a permeability retentive calcium silicate cement in the higher permeability zone. The calcium silicate cement which is formed is stable at high pH's and temperatures in excess of about 400° F. These steps can be repeated until the zone has been closed or consolidated to the extent desired.

Once the higher permeability zone has been closed or consolidated as desired, a water-flooding, carbon dioxide stimulation, steam-flooding, or fire-flooding enhanced oil recovery method can be used to produce hydrocarbonaceous fluids to the surface. By controlling the concentration and rate of injection of the aqueous silicate and the organic solvent containing the inorganic salt or chelated calcium compound which are injected into the higher permeability zone, the consolidation strength of the formation can be tailored as desired while retaining a desired permeability.

It is therefore an object of this invention to provide for an in-situ calcium silicate composition for reducing the permeability of a zone within a formation which is more natural to a formation's environment.

It is another object of this invention to provide for a composition which will ensure an even flow front and a homogeneous consolidation when reducing the permeability of a zone.

It is a still yet further object of this invention to provide for a formation profile control method which can be reversed by treating the consolidated interval with a strong acid.

It is an even still yet further object of this invention to provide for a formation consolidation agent which is resistant to high temperatures and high pH's.

BRIEF DESCRIPTION OF THE PREFERRED EMBODIMENT

Figure 1:
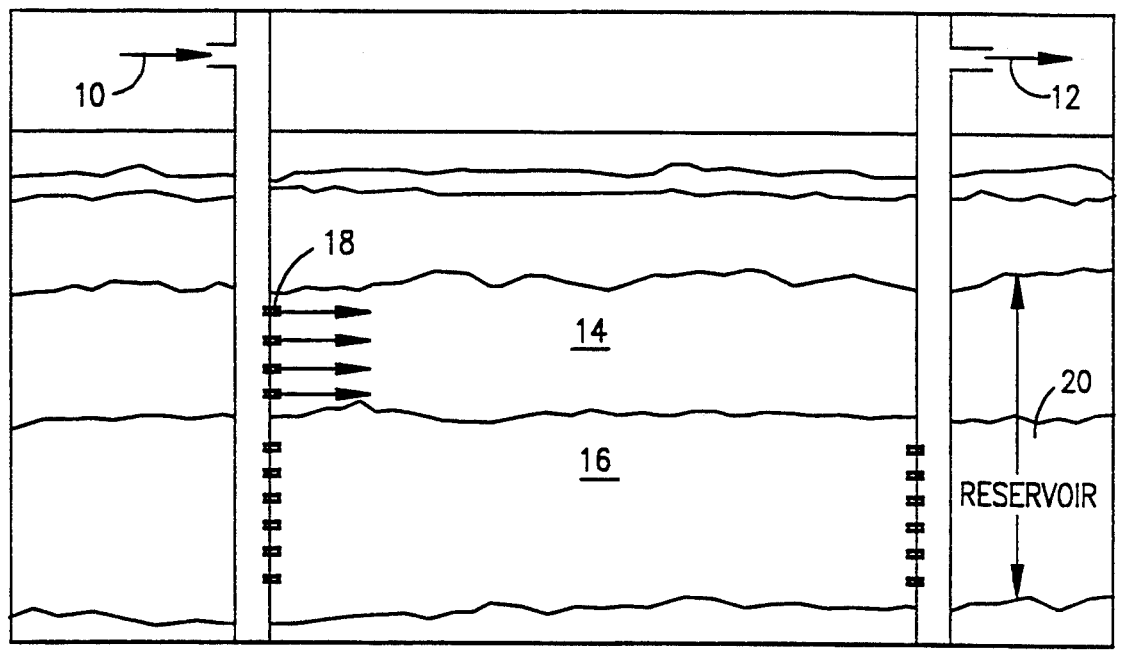
FIG. 1 is a schematic illustration which shows placement of the components of this invention in a higher permeability zone of a formation.

This invention concerns an improvement in the sweep efficiency of an EOR process by injecting sequentially solutions sufficient to form a silicate cement in-situ in a higher permeability zone of a formation so as to close an oil-depleted zone. When a need to close the higher permeability zone has been determined, an aqueous solution containing an organoammonium silicate, alkali metal or ammonium silicate is injected into the higher permeability zone. Once the aqueous silicate solution has progressed into the higher permeability zone to the extent desired, a spacer volume of a water-miscible organic solvent is next injected into the higher permeability zone to separate the aqueous silicate slug from an organic solvent containing an inorganic salt, preferably hydrated calcium chloride or a chelated calcium compound.

This spacer volume of solvent is selected from a member of the group consisting of methanol, ethanol, higher alcohols glycols, ketones, tetrahydrofuran, and dimethyl sulfoxide. Solvents used as a spacer volume may be of an industrial grade. Utilization of the spacer volume should be kept to a minimum in order to obtain a higher degree of plugging. If residual permeability is desired the volume of solvent slug should be increased.

After placing the spacer volume of solvent into the higher permeability zone, a similar solvent containing an inorganic salt, preferably hydrated calcium chloride or a chelated calcium compound is directed into the higher permeability zone. This inorganic salt or chelated compound reacts with the organoammonium silicate, alkali metal or ammonium silicate thereby forming a silicate cement in-situ which consolidates and controls permeability in the higher permeability zone. Injection of the organoammonium silicate, alkali metal or ammonium silicate solution, spacer volume of solvent, and organic solvent containing said salt or chelated compound, can be repeated until the higher permeability zone is consolidated and its permeability reduced to a desired extent.

In order to increase the cement's consolidating and plugging ability, the concentration of the organoammonium silicate, alkali metal silicate or ammonium silicate contained in an aqueous solution or the inorganic salt or chelated calcium compound contained in the solvent can be increased. Similarly, the flow rates of the solution or solvent slugs through the higher permeability zone can be decreased to obtain better consolidation and plugging strength. A decreased flow rate is particularly beneficial for increasing plugging or consolidation and controlling permeability when the organic solvent slug containing the salt or chelated compound flow rate is decreased. As will be understood by those skilled in the art, optimal concentrations and flow rates are formation dependent. Therefore, optimal concentrations and flow rates should be geared to field conditions and requirements.

Organoammonium silicates which can be used in an aqueous solution include tetra-ammonium silicate and other alkyl, aryl, or hetero atoms containing moieties such as sulfur or oxygen with ten or less carbon atoms are preferred.

After the higher permeability zone has been consolidated and the permeability reduced to the extent desired, a carbon dioxide, thermal oil recovery or waterflooding EOR method is initiated into a zone of lesser permeability within the formation and hydrocarbonaceous fluids are removed therefrom. The formations which are plugged and consolidated can include unconsolidated or loosely consolidated ones. Unconsolidated sand formations are also included. While the EOR method is being conducted in the lower permeability zone, temperatures within that zone may exceed about 400° F. This zone may also have a pH of 7 or more. A method for the selective placement of polymer gels for profile control in a thermal oil recovery method is discussed in U.S. Pat. No. 4,804,043 which issued to Shu et al. on Feb. 14, 1989. This patent is hereby incorporated by reference herein.

Steam-flooding processes which can be utilized when employing this profile control method described herein are detailed in U.S. Pat. Nos. 4,489,783 and 3,918,521 which issued to Shu and Snavely, respectively. U.S. Pat. No. 4,479,894 that issued to Chen et al. describes a water-flooding process that can be used herein. Fire-flooding processes which can be utilized herein are disclosed in U.S. Pat. Nos. 4,440,227 and 4,669,542 which issued to Holmes and Venkatesan, respectively. These patents are hereby incorporated by reference herein.

A carbon dioxide EOR process which can be used after consolidating the higher permeability zone is disclosed in U.S. Pat. No. 4,513,821 which issued to W. R. Shu on Apr. 30, 1985. This patent is hereby incorporated by reference herein.

Organoammonium silicate, ammonium or alkali metal silicates having a $SiO_2/M_2O$ molar ratio of about 0.5 to about 4 are suitable for forming a stable silicate cement. The metal (M) which is utilized herein comprises sodium, potassium, or lithium ions. Sodium and potassium silicate comprise the preferred inorganic silicates. Silicates containing ammonium ions can be used also. Preferably, the $SiO_2/M_2O$ molar ratio is in the range of about 0.5 to about greater than 2. The concentration of the silicate solution is about 10 to about 60 wt. percent, preferably 20 to about 50 wt. percent. As will be understood by those skilled in the art, the exact concentration should be determined for each application. In general, concentrated silicate solutions are more viscous and more effective in plugging or consolidating due to higher contents of solids.

In those cases where it is not possible to control the viscosity of the silicate solution and preclude entry into a lower permeability zone, a mechanical packer may be used. The silicate cement which is formed can with stand pH's of 7 or more and temperatures up to and in excess of about 400° F. The preferred silicates are sodium, lithium and potassium. Potassium is preferred over sodium silicate because of its lower viscosity. Fumed silica, colloidal silica, or other alkali metal hydroxides can be added to modify the $SiO_2/M_2O$ molar ratio of commercial silicate. Colloidal silicate can be used alone or suspended in alkali metal or ammonium silicate as a means of modifying silicate content, pH, and/or $SiO_2$ content. In a preferred embodiment, two parts of the aqueous silicate are mixed with one part colloidal silicate.

Organoammonium silicates which can be used in an aqueous solution include those that contain $C_1$ through $C_8$ alkyl or aryl groups and hetero atoms. Tetramethyl ammonium silicate is preferred.

The inorganic salt which can be used herein is one which is soluble in alcohol. Calcium chloride hydrate is preferred. However, chelated calcium forms can also be used. Methanol and ethanol are the alcohols preferred for use herein. Ethanol is most preferred. This is due to their high availability. Higher alcohols also can be utilized, as well as other solvents capable of dissolving calcium salts and chelates. Previously mentioned solvents such as ketones, tetrahydrofuran (THF), and dimethyl sulfoxide (DMSO) can be utilized. The concentration of calcium chloride hydrate should be in the range of about 10 to about 40 wt. percent, preferably 20 to about 30 wt. percent. Of course, enough calcium chloride solution should be used to complete the reaction with the alkali metal silicate.

Figure 2:
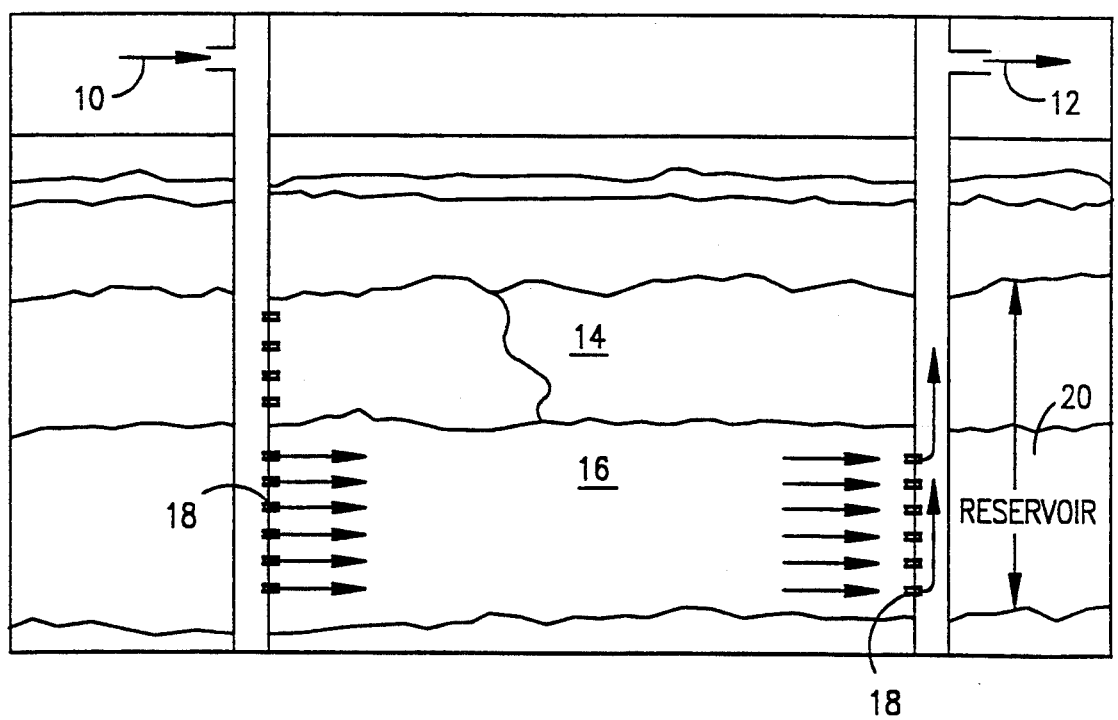
FIG. 2 is a schematic illustration which depicts a higher permeability zone closed with the composition of this invention while an enhanced oil recovery (EOR) method is being initiated in a lower permeability zone.

Referring to FIG. 1, an alkaline metal silicate is injected into injector well 10 where it enters high permeability zone 14 of reservoir 20 through perforations 18. Afterwards, an alcoholic solution containing a calcium salt soluble therein is injected into higher permeability zone where it forms calcium silicate cement in-situ which is stable to temperatures in excess of about 400° F. Once the calcium silicate has hardened and the permeability of higher permeability zone 14 has been reduced to the extent desired, by repeated applications if necessary, steam injection is initiated into lower permeability zone 16 as is shown in FIG. 2. Steam exits reservoir 20 by perforations 18 into producer well 12.

Referring to FIG. 1, an aqueous solution of an organoammonium silicate, alkali metal or ammonium silicate is injected into injector well 10 where it enters higher permeability zone 14 of reservoir 20 through perforations 18. Next a spacer volume of a water-miscible organic solvent is injected into zone 14. Afterwards, a water-miscible organic solvent containing an inorganic salt or chelated calcium compound therein is injected into higher permeability zone 14 where it forms in-situ a silicate cement which is stable to temperatures up to and in excess of about 400° F. Once the silicate cement has hardened and higher permeability zone 14 has been plugged and consolidated to the extent desired, by repeated applications if necessary, an EOR operation is initiated into lower permeability zone 16 as is shown in FIG. 2. A flooding medium used in the EOR operation exists reservoir 20 by perforations 18 into producer well 12.

As the aqueous organoammonium silicate, alkali metal or ammonium silicate solution proceeds through higher permeability zone 14, it deposits a film of said aqueous silicate on sand grains therein. This aqueous silicate also fills intersitial spaces between the sand grains. A spacer volume of the water-miscible solvent is directed through zone 14 so as to separate aqueous silicate from the inorganic salt or chelated calcium compound contained in the solvent. The solvent containing the inorganic salt or chelated calcium compound is injected into zone 14 in a concentration and at a rate sufficient to bind and consolidate the sands in zone 14 thereby closing or plugging said zone by forming a silicate cement therein.

In another embodiment, an inorganic salt or chelated calcium compound is used in the organic solvent to form a silicate cement in combination with an alkylpolysilicate (EPS). Similarly, a spacer volume of hydrocarbonaceous liquid is used to separate the calcium chloride solution slug from the EPS organic solvent slug.

While hydrated calcium chloride is preferred, cations of other chlorides can be used. Other chlorides that can be used comprise titanium dichloride, zirconium chloride, aluminum chloride hydrate, ferrous chloride, and chromous chloride.

Alkylpolysilicate (EPS) contained in the water-miscible organic solvent is the hydrolysis-condensation product of alkylorthosilicate according to the reaction equation below:

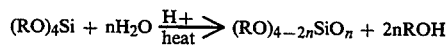

where $n \leq 2$ $R = C_1 - C_{10}$

R should be $\leq 10$ carbons for good solubility and high $SiO_2$ content.

Tetramethyl (TMS) or tetraethylorthosilicates (TEOS) are preferred. Mixed alkylorthosilicate can also be used. It is desirable to obtain an alkylpolysilicate with $n > 0.5$, preferably n greater than 1. As n increases, the $SiO_2$ content increases, resulting in stronger consolidation. It is desirable to use an alkylpolysilicate with a silica content of 30% or more, preferably about 50%. EPS which is used herein is placed into a water-miscible organic solvent. The preferred solvent is ethanol. Of course, other alcohols can be used. EPS, TMS, TEOS, or other alkylpolysilicates are contained in the solvent in an amount of from about 10 to about 90 weight percent sufficient to react with the silicates contained in the aqueous solution. Although alcohol is the solvent preferred because of its versatility and availability, other water-miscible organic solvents can be utilized. These solvents include methanol and higher alcohols, glycols, ketones, tetrahydrofuran (THF), and dimethyl sulfoxide (DMSO).

Although ethanol is the preferred solvent, higher alcohols also can be utilized, as well as other solvents capable of dissolving alkylpolysilicates. The concentration of alkylpolysilicate should be in the range of about 10 to about 100 wt. percent, preferably 20 to about 80 wt. percent. Of course, enough alkylpolysilicate should be used to complete the reaction with organoammonium silicate, alkali metal or ammonium silicate.

The calcium salt which can be used herein is one which is soluble in alcohol or the water-miscible organic solvent. Calcium chloride hydrate is preferred. However, chelated calcium forms can also be used. Higher alcohols also can be utilized, as well as other solvents capable of dissolving calcium salts and chelates. The concentration of calcium chloride hydrate should be in the range of about 10 to about 40 wt. percent, preferably 20 to about 30 wt. percent. Of course, enough EPS and calcium chloride solution should be used to complete the reaction with the aqueous silicate.

Although the present invention has been described with preferred embodiments, it is to be understood that modifications and variations may be resorted to without departing from the spirit and scope of this invention, as those skilled in the art readily understand. Such variations and modifications are considered to be within the purview and scope of the appended claims.

What is claimed:

1. A composition for forming a silicate cement sufficient to close a zone of a formation to fluid flow consisting of:
    (a) an aqueous solution of a silicate selected from a member of the group consisting of alkali metal silicate, ammonium silicate and organoammonium silicate which is contained in said solution in an amount of from about 10 to about 60 wt %;
    (b) a spacer volume of a water-miscible organic solvent selected from the group consisting of methanol, ethanol, higher alcohols, glycols, ketones, tetrahydrofuran and dimethyl sulfoxide; and
    (c) a water-miscible organic solvent containing an alkylpolysilicate in an amount of about 10 to about 100 wt % and a member selected from the group consisting of an inorganic salt or chelated calcium in an amount of from about 10 to about 40 wt % sufficient to react with said organoammonium silicate, alkali metal or ammonium silicate so as to form a permeability retentive silicate cement within a zone of a formation so as to close said zone to fluid flow.

2. The composition as recited in claim 1 where the alkali metal silicate comprises ions of sodium, potassium, or lithium, and mixtures thereof.

3. The composition as recited in claim 1 where the alkali metal silicate has a silicon dioxide to metal oxide molar ratio of less than about 4.

4. The composition as recited in claim 1 where said alkylpolysilicate comprises tetramethyl or tetraethylorthosilicates and said salt is selected from a member of the group consisting of calcium chloride hydrate and chelated calcium chloride.

5. The composition as recited in claim 1 where said silicate cement withstands temperatures in excess of about 400° F.

6. The composition as recited in claim 1 where the silicate cement withstands a temperature in excess of about 400° F. and a pH of about 7 or more.

7. The composition as recited in claim 1 where in (c) said alkylpolysilicate is a hydrolysis-condensation product of alkylorthosilicate according to the equation below:

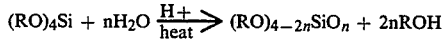

where $n \leq 2$ and $R = C_1\text{-}C_{10}$.

* * * * *